(12) United States Patent
Marchesotti

(10) Patent No.: US 8,285,059 B2
(45) Date of Patent: Oct. 9, 2012

(54) METHOD FOR AUTOMATIC ENHANCEMENT OF IMAGES CONTAINING SNOW

(75) Inventor: Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1177 days.

(21) Appl. No.: 12/123,586

(22) Filed: May 20, 2008

(65) Prior Publication Data

US 2009/0290807 A1 Nov. 26, 2009

(51) Int. Cl.
*G06K 9/62* (2006.01)
(52) U.S. Cl. .................... 382/224; 382/167; 382/274
(58) Field of Classification Search .............. 382/167, 382/224, 274
See application file for complete search history.

(56) References Cited

U.S. PATENT DOCUMENTS

| | | | |
|---|---|---|---|
| 5,347,374 A | 9/1994 | Fuss et al. | |
| 5,357,352 A | 10/1994 | Eschbach et al. | |
| 5,363,209 A | 11/1994 | Eschbach et al. | |
| 5,371,615 A | 12/1994 | Eschbach | |
| 5,414,538 A | 5/1995 | Eschbach | |
| 5,450,217 A | 9/1995 | Eschbach | |
| 5,450,502 A | 9/1995 | Eschbach et al. | |
| 5,802,214 A | 9/1998 | Eschbach et al. | |
| 6,267,051 B1 | 7/2001 | Feldman et al. | |
| 6,502,583 B1 | 1/2003 | Utsugi | |
| 6,573,932 B1 | 6/2003 | Adams et al. | |
| 7,031,534 B2 | 4/2006 | Buckley | |
| 7,035,467 B2 | 4/2006 | Nicponski | |
| 7,593,590 B2 * | 9/2009 | Shimizu ................. | 382/274 |
| 7,679,786 B2 * | 3/2010 | Scott et al. .............. | 358/2.1 |
| 2002/0172419 A1 | 11/2002 | Lin et al. | |
| 2007/0005356 A1 | 1/2007 | Perronnin | |
| 2007/0258648 A1 | 11/2007 | Perronnin | |
| 2008/0069456 A1 | 3/2008 | Perronnin | |

OTHER PUBLICATIONS

U.S. Appl. No. 11/170,496, filed Jun. 30, 2005, Perronnin.
U.S. Appl. No. 11/524,100, filed Sep. 19, 2006, Perronnin.
U.S. Appl. No. 11/637,984, filed Dec. 13, 2006, Digby.
U.S. Appl. No. 11/767,739, filed Jun. 25, 2007, Bressan, et al.
U.S. Appl. No. 11/801,230, filed May 9, 2007, Marchesotti, et al.
U.S. Appl. No. 12/033,434, filed Feb. 19, 2008, Czurka.
U.S. Appl. No. 12/049,520, filed Mar. 17, 2008, Marchesotti.
L.Marchesotti, Improving Holiday Pictures: Winter and Beach Image Enhancement, *IS&T/SPIE Intl. Symposium on Electronic Imaging*, Image Quality and System Performance V, San Jose, CA, Jan. 2008.
B.Zafarifar, Blue Sky Detection for Picture Quality Enhancement, *Consumer Electronics, ICCE*, Digest of Technical Papers, International Conference, Jan. 2007.
G.Csurka, et al., Visual Categorization with Bags of Keypoints, *ECCV International Workshop on Statistical Learning in Computer Vision*, Prague, 2004.
P.Haeberli, et al., Image Processing by Linear Interpolation and Extrapolation, *IRIS Universe Magazine*, Silicon Graphics, 28, 1994.

(Continued)

*Primary Examiner* — Phuoc Tran
(74) *Attorney, Agent, or Firm* — Fay Sharpe LLP

(57) ABSTRACT

A content-based image processing method and system are provided for images identified as having snow content. Images having dark snow content are identified and processed with a first enhancement chain tailored to enhancing images which would be generally perceived as having dark snow while images having blue snow content are identified and processed with a second enhancement chain tailored to enhancing images which would be generally perceived as having blue snow.

22 Claims, 5 Drawing Sheets

OTHER PUBLICATIONS

F. Perronnin, et al., Adapted Vocabularies for Generic Visual Categorization, *In European Conf. on Computer Vision*, 2006.

P. Quelhas, et al., Modeling Scenes with Local Descriptors and Latent Aspects, *In ICCV*, 2005.

P. Carbonetto, et al., A Statistical Model for General Contextual Object Recognition, *In ECCV*, 2004.

A. Bosch, et al., Scene Classification via pLSA, *In ECCV*, 2007.

M. Fischer, et al., Weighted Median Image Sharpeners for the World Wide Web, *IEEE Trans. on Image Processing*, 11(7), 2002.

T. Saito, et al., Color Image Sharpening Based on Nonlinear Reaction-Diffusion, *In ICIP*, 2003.

A. Polesel, et al., Image Enhancement via Adaptive Unsharp Masking, *IEEE Trans. on Image Processing*, 9(3), 2000.

K. Barnard, et al., A Comparison of Computational Color Constancy Algorithms, *IEEE Trans. on Image Processing*, 11(9), 2002.

R. Eschbach, et al., Automatic Enhancement of Scanned Photographs, *In El Color Imaging: Device Independent Color, Color Hardcopy and Graphic Arts*, 1999.

\* cited by examiner

METHOD FOR AUTOMATIC ENHANCEMENT OF IMAGES CONTAINING SNOW

CROSS REFERENCE TO RELATED PATENTS AND APPLICATIONS

The following copending applications, the disclosures of which are incorporated herein by reference in their entireties, are mentioned:

U.S. application Ser. No. 11/637,984, filed Dec. 13, 2006, entitled PRINTER WITH IMAGE CATEGORIZATION CAPABILITY, by Anthony Digby.

U.S. application Ser. No. 11/801,230, filed May 9, 2007, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

U.S. application Ser. No. 11/767,739, filed Jun. 25, 2007, entitled CLASS-BASED IMAGE ENHANCEMENT SYSTEM, by Marco Bressan, et al.

U.S. application Ser. No. 12/033,434, filed Feb. 19, 2008, entitled CONTEXT DEPENDENT INTELLIGENT THUMBNAIL IMAGES, by Gabriela Czurka.

U.S. application Ser. No. 12/049,520 filed Mar. 17, 2008, entitled AUTOMATIC GENERATION OF A PHOTO GUIDE, by Luca Marchesotti.

BACKGROUND

The exemplary embodiment relates to the field of image processing. It finds particular application in connection with the automated enhancement of digital images, and is described with particular reference thereto. However, it is to be appreciated that it may find more general application in image classification, image content analysis, and so forth.

Widespread availability of devices capable of acquiring digital images, such as digital cameras, cell phones, and other direct-digital imagers, and of optical scanners that convert film images, paper-printed images, and the like into digital format, has led to generation of large numbers of digital images. Regardless of the final medium in which the images will be managed, shared and visualized, the quality expectations of users are growing.

Digital images containing snow, however, often do not meet the user's expectations. This may be the result of the digital camera selecting incorrect settings which can result in underexposed or unnatural bluish pictures. The general assumption is that the average color of a photo should be gray. As a result, cameras compensate for what is assumed to be excess whiteness of the snow to the detriment of other darker colors. The resulting image appears flat and the snow dark. In other cases, the snow can look bluish when shooting under a blue sky, due to the scattering of light by the sky and the reflection from the snow of the bluish light.

To compensate for dark images, experienced photographers may manually overexpose when shooting in snow, e.g., by using a rule of thumb of +½ stops, or they may select a snow/winter shooting mode in the camera. In extreme cases, gray card targets may be employed to set the exposure/color balance meters. These operations are often time consuming and may require a level of expertise that is typically not met by the amateur photographer.

Amateur photographers often make use of online photofinishing or other automated or semi-automated image enhancement tools to compensate for degradations in image quality. These tools may include contrast and edge enhancement, noise filtering for a wide variety of noise sources, sharpening, exposure correction, color balance adjustment, automatic cropping, and correction of shaky images. Automated correction techniques, however, often fail to correct the problems associated with snow scenes or apply a correction which gives the image an unnatural appearance.

The exemplary embodiment overcomes these problems by providing automated techniques for improving the visual appearance of images containing snow.

INCORPORATION BY REFERENCE

The following references, the disclosures of which are incorporated herein in their entireties by reference, are mentioned:

U.S. Pat. No. 6,267,051, entitled METHOD AND SYSTEM OF IMPLEMENTING CORRECTIONS IN UNDERWATER IMAGES, by Feldman, et al., discloses determining the existence of an image captured underwater by analyzing the image record or obtained by reading information received from the customer image order and determining a level of correction for the image.

U.S. Pat. No. 7,035,467, entitled METHOD AND SYSTEM FOR PROCESSING IMAGES FOR THEMED IMAGING SERVICES, by Nicponski, discloses determining the general semantic theme of a group of images. A plurality of semantic theme processors, one for each semantic classification, is provided to produce enhanced value imaging services and products for image groups that fall into an appropriate semantic theme.

Luca Marchesotti and Marco Bressan, "Improving Holiday Pictures: winter and beach image enhancement", IS&T/SPIE's International Symposium on Electronic Imaging, Image Quality and System Performance V, 27-31 Jan. 2008, San Jose, Calif., USA, disclose linking assessments of perceptual quality to enhancement algorithms.

U.S. Pub. No. 20070005356, published Jan. 4, 2007, entitled GENERIC VISUAL CATEGORIZATION METHOD AND SYSTEM, by Florent Perronnin, discloses techniques for classifying images based on class visual vocabularies constructed by merging a general visual vocabulary with class-specific visual vocabularies.

U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. An image classifier classifies the image respective to the plurality of image classes based on the gradient-based vector representations of class similarity.

U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin, discloses an image classification method which includes generating category context models for image categories which include sums of soft co-occurrences of pairs of visual words in geometric proximity to each other in training images assigned to the category. An image category can be assigned to a new image to be classified based on closeness of context information about the image to the category context models.

U.S. Pat. Nos. 5,357,352, 5,363,209, 5,371,615, 5,414,538, 5,450,217; 5,450,502, 5,802,214 to Eschbach, et al., U.S. Pat. No. 5,347,374 to Fuss, et al., and U.S. Pat. No. 7,031,534 to Buckley disclose automated image enhancement methods.

Csurka, et al., "Visual Categorization with Bags of Keypoints," ECCV International Workshop on Statistical Learning in Computer Vision, Prague, 2004, discloses a method for generic visual categorization based on vector quantization.

US Pub. No. 2002/0172419, entitled IMAGE ENHANCEMENT USING FACE DETECTION, by Lin, et al., discloses using face detection algorithms for automatically detecting human faces in an image and automatically enhancing an appearance of the image based on the human faces in the image.

BRIEF DESCRIPTION

In accordance with one aspect of the exemplary embodiment, a content-based image processing method is provided. The method includes, for an original image, automatically identifying whether the image includes snow content and, if the image is identified as including snow content, automatically assigning a degradation class for the image, selected from a plurality of degradation classes. The degradation classes include a first class for dark snow images and a second class for blue snow images. The image is processed to generate an enhanced image, which includes, where the image is assigned to the first class, applying a first enhancement chain, and where the image is assigned to the second class, applying a second enhancement chain. The enhanced image is output.

In accordance with another aspect, a content-based image processing system includes a snow identifier which is configured for automatically identifying whether an original image includes snow content and a snow degradation classifier which, for an image which is identified by the snow identifier as including snow content, automatically assigns a degradation class for the image, selected from a plurality of degradation classes, the classes including a first class for dark snow images and a second class for blue snow images. The system applies a first enhancement chain to images assigned to the first degradation class and a second enhancement chain to images assigned to the second degradation class.

In accordance with another aspect, a method for processing a set of images includes inputting a set of original images, automatically identifying images having dark snow content and automatically identifying images having blue snow content. For the images identified as having dark snow content, the method includes automatically applying an enhancement chain which includes a non-linear luminance transformation and a saturation enhancement operation. For the images identified as having blue snow content, the method includes automatically applying an enhancement chain which includes a dynamic range mapping and a color balance correction to the image which decreases an amount of the blue component of the image non-uniformly as a function of gray level. The enhanced images are output.

DETAILED DESCRIPTION

Aspects of the exemplary embodiment relate to an automated system and method for image enhancement in which images having a snow content are automatically identified. A degradation class of each snow-content image is automatically determined. Image enhancements based on the determined degradation class are then applied which are tailored to the class of degradation.

Snow comprises crystalline frozen water having reflective properties, and which in natural light typically appears white to an observer. Digital images which are identified as having snow content generally include a significant portion of the image data (such as at least 10% or at least 20%, or more) corresponding to snow. In capturing an image of an outdoor environment where snow is present, the observer generally desires to retain the observed whiteness of the snow while retaining the colors of other image content, such as people, buildings and the like. However, the resulting image, when captured with an image capture device, such as a digital camera or cell phone with image acquisition capability, may not capture the original intent of the observer and appear bluish or dark. The blue snow problem is a function of the lighting environment: it occurs only in blue sky conditions where light can be scattered by the sky, which increases the blue component. The dark image problem is a function of the camera, and occurs in cloudy conditions where the camera assumes that the image is too white and raises the threshold for white and everything in the image tends to appears darker—i.e., more gray.

As used herein, image enhancements are modifications to the image that are expected to improve the perceptual quality of the image. However, since the application of these image enhancements is automated, it will be appreciated that an assurance that perceptual quality will be improved cannot be guaranteed in all cases of enhancement.

Figure 1:
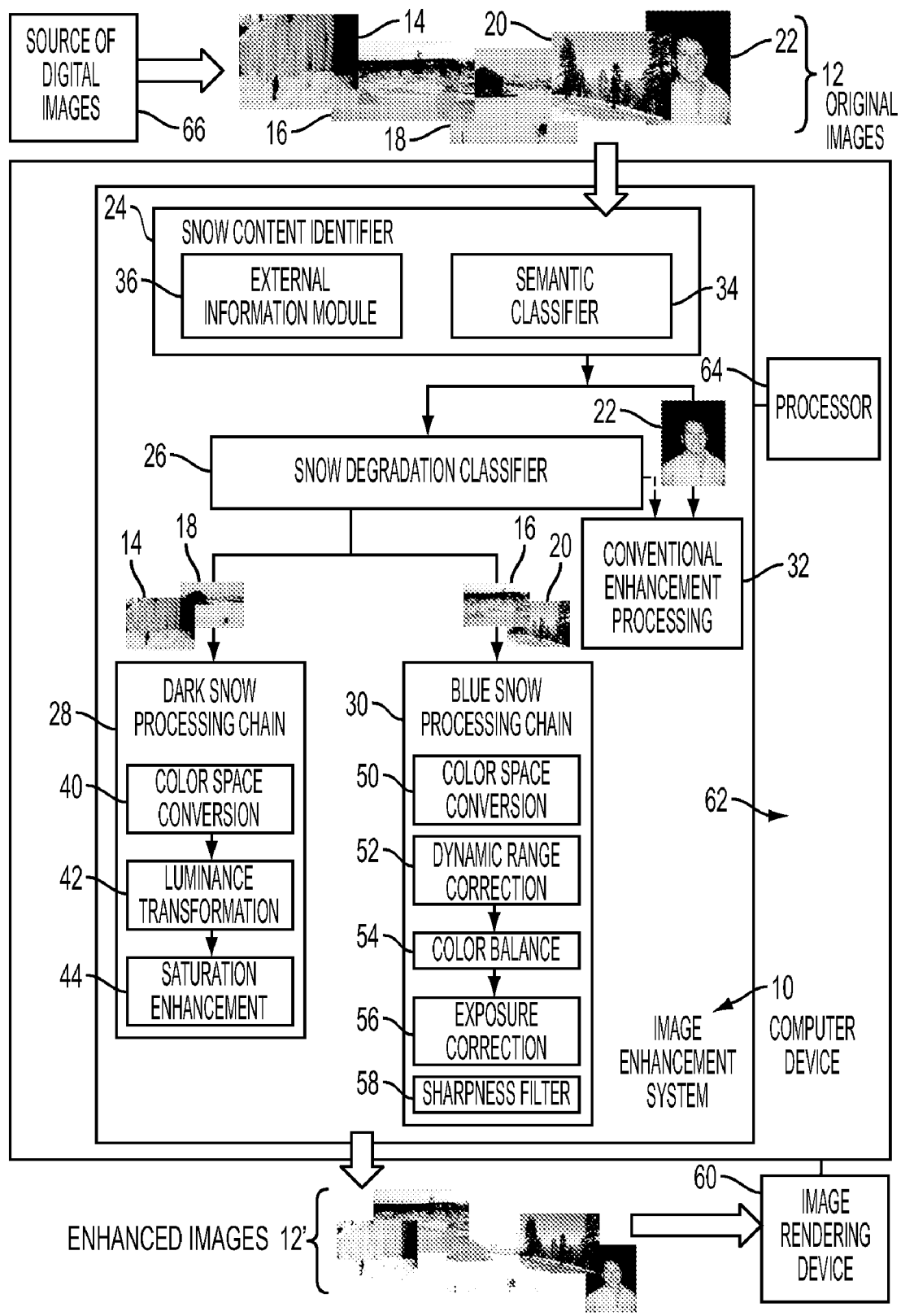
FIG. 1 is a functional block diagram of an automated image enhancement system in accordance with a first aspect of the exemplary embodiment.
Figure 2:
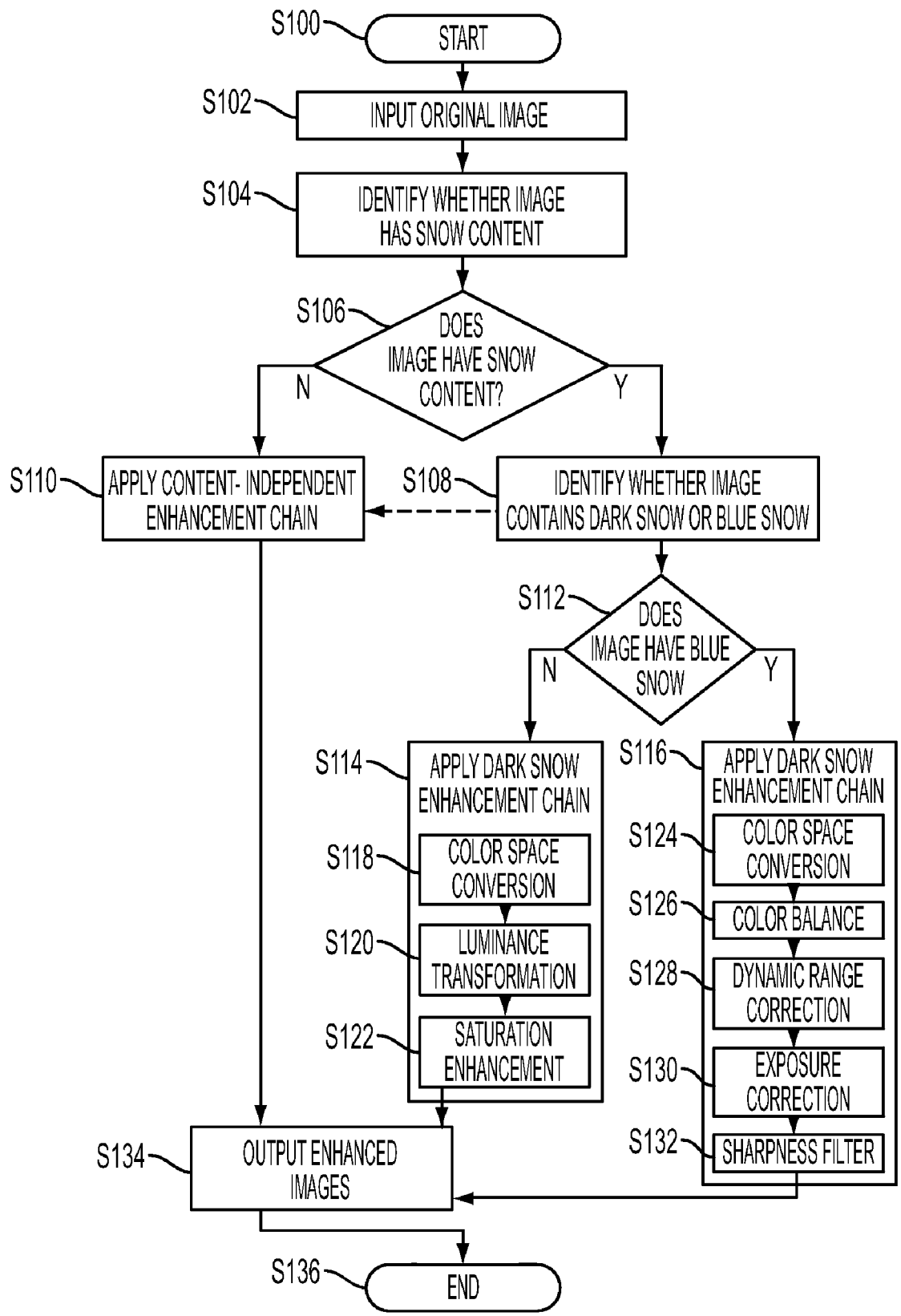
FIG. 2 illustrates an automated image or semi-automated enhancement method in accordance with a second aspect of the exemplary embodiment.

FIG. 1 illustrates an exemplary automated image enhancement system 10 which may be used in performing the exemplary method described herein with reference to FIG. 2. A set 12 of acquired original images 14, 16, 18, 20, 22 to be processed by the system 10 is input in digital form. If the original images are not already in digital form they may be converted to digital form prior to processing. As will be appreciated, the images 14-22 shown in FIG. 1 are for illustration purposes only and do not accurately reflect the system capabilities.

The system 10 includes various image data processing components including a snow content identifier 24, a degradation classifier 26, and components for applying degradation-specific image enhancement chains 28, for images identified as comprising dark and blue snow, respectively. Optionally, the system includes a content independent image enhancement processing component 32 for processing other images.

The exemplary snow content identifier 24 includes a semantic classifier 34, which classifies each of the input images based on image content to identify images having snow content. In particular, the classifier 34 may be a binary classifier which classifies an image as either having snow content or not having snow content. In other embodiments, the identifier 24 additionally or alternatively relies on external information to identify snow content images. For example, an external information module 36 identifies metadata associated with the image, such as GPS tags, labels applied by the photographer, etc., and uses that information to identify images likely to have snow content. Alternatively, the images having snow content may be manually identified and labeled.

Those images identified as having snow content are further processed by the degradation classifier 26, which classifies degradation of the original image according to type. In the exemplary embodiment, the degradation classifier 26 assigns the image to one of two classes: A: "dark images," and B: "blue snow images." In another embodiment, the degradation classifier 26 classifies the image into one of three (or more) classes, such as: A: "dark images", B: "blue snow images," and C: "all others". It is to be appreciated, however, that the degradation types and number of degradation classes may be different from these.

The images classes as A or B are then subjected to image enhancement. Images assigned to class A are processed by a first image enhancement chain 28 tailored to improving the perceived quality of dark snow images. Images assigned to class B are processed by a second image enhancement chain 30, tailored to improving the perceived quality of blue snow images and thus using different image enhancement techniques from the first chain. In particular enhancement chain 28 for dark snow includes color space conversion, luminance transformation, and saturation enhancement processing components 40, 42, and 44, which perform operations on the image in a sequence, as described in greater detail below. Enhancement chain 30 for blue snow includes color space conversion, dynamic range correction, color balance, exposure correction, and sharpness processing components 50, 52, 54 56 and 58, which perform operations on the image in a sequence, as described in greater detail below.

In the case of mages which are in class C (or which are classed by the classifier 34 as not snow), may be processed by the conventional image enhancement module 32, which may operate independently of image content.

The set 12' of enhanced or otherwise processed images, 14', 16', 18', 20', 22' output by these processing components 28, 30, 32 may optionally undergo further image processing and/or user validation prior to being output in digital form or in tangible media. In one embodiment, the output images are sent to an image rendering device 60, such as a printer, for printing on print media, such as photo-quality paper, using colorants, such as inks or toners.

The exemplary image enhancement system 10 may be embodied in hardware, software, or a combination thereof. In the exemplary embodiment, the image enhancement system 10 is hosted by a computing device 62, such as a general purpose computer, e.g., a desktop or laptop computer, palmtop device, PDA, or by a server, or other dedicated computing device. The various processing components of the system 10 may comprise software instructions, stored in the computing device's memory, which are executed by an associated processor 64. Images may be stored in the computer's memory or a separate data storage memory 66 accessible to the processor 64, during processing. The computing device may be in communication with a source 68 of digital images, such as a user's computing device, via a wired or wireless link. For example, the system 10 may be resident at a photofinishing service which receives the images from a user, e.g., via the Internet or on a disk or other tangible recording medium, automatically processes the images using the exemplary system 10, and then returns the processed images in digital or tangible form to the user. In another embodiment, the system 10 may be resident on a user's computer or accessed therefrom via a web browser. In this embodiment, the user may be provided with the opportunity to accept or reject the proposed enhancements.

FIG. 2 illustrates an exemplary image processing method which may be performed with the system shown in FIG. 1. Briefly, the method begins at S100. At S102, an image or set of images to be processed is input. At S104, each input image is processed to identify whether the image contains snow. In particular, images are classified to identify images with snow content. If at S106, an image is identified as having snow content, the method proceeds to S108, where enhancement opportunities are detected, otherwise, the method proceeds to S110. At S108, images containing snow are classified according to degradation type. If at S112, if the image is assigned to a dark snow class, the image is processed according to a first image enhancement chain (S114), designed to correct dark snow degradation. If the image is assigned to a blue snow class, the image is processed according to a second image enhancement chain (S116), designed to correct blue snow degradation. In particular, the first image enhancement chain includes color space conversion, luminance transformation, and saturation enhancement processing substeps S118, S120, and S122 and the second enhancement chain for blue snow includes color space conversion, dynamic range correction, color balance, exposure correction, and sharpness processing substeps S124, S126, S128, S130, and S132.

If at S108, snow enhancement opportunities are not detected, then the image may be processed at S110 with a conventional enhancement technique, such as Xerox's Automated Image Enhancement (AIE) techniques. Steps S104-S116 may be repeated for each image in the set. Thus, in any image set, some images may undergo enhancement by S110, while others undergo enhancement by S114, and yet others may undergo enhancement by S116.

The processed images may be combined and output as a processed set at S134, optionally printed, and returned in digital and/or tangible form to the user. Optionally, a user verification step allows the user to review the automatically enhanced image(s) and accept or reject the enhancement(s). The method ends at S136.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for processing images.

Further details of the system and method will now be described.

Image Input (S102)

Images may be received by the system 10 in any convenient file format, such as JPEG, TIFF, or the like. Images may be individual or video images. In general, each input digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color channel, however expressed (RGB, YCbCr, etc.). The exemplary embodiment is not intended for black and white (monochrome) images, although it could be modified to allow processing of such images.

Snow Image Identification (S104)

The semantic classifier 34 may be one which has been trained on a large set of manually labeled training images. Specifically, human observers are used to identify images containing snow and the images containing snow (or at least a threshold amount of snow) are then labeled as having "snow content." All the remaining images may be labeled as "not snow," or may be further classified. The classifier 34 is trained with these manually labeled images. The training involves automatically extracting features from the images and identifying features of the images which allow each of the images to be associated with one of the two (or more) classes.

In one embodiment, images with less than a threshold amount of snow may be labeled as "not snow" by the human observers. The threshold may be determined by identifying whether there is a user preference for images with only small amounts of snow that are processed by conventional techniques over those processed by the exemplary snow enhancement processing methods. The human observers may then be instructed to label as "no snow," those images having less than an approximate threshold proportion of snow in the image, e.g., less than about 10% of area coverage.

The trained classifier 34 may output a confidence measure for a new image that the image belongs to the "snow content" class (or "no snow" class). The confidence measure can be converted to a binary decision, "snow content" or "not snow." The threshold for the decision may be set based on user preferences, i.e., whether users prefer images which have been enhanced by the methods described herein over conventional methods if the confidence is low.

The semantic classifier 34 may be of any suitable type, such as neural networks, support vector machines, or the like. In one embodiment, the classifier is a generic type of visual classifier, such as the Xerox Generic Visual Classifier (GVC).

Such a classifier labels patches (small regions) of an image based on semantic content, for example, by generating low level features, such as a features vector, one for each patch. The classifier uses a vocabulary of visual words (or multi-word terms) to characterize images with a histogram of visual word counts. For the specific case of snow/non-snow image classification, such features can sample the chromatic content of the image. Every image is characterized by a set of histograms—one per class—where each histogram describes whether the image content is best modeled by the universal vocabulary or the corresponding class vocabulary. This framework is applied to two types of local image features: low-level descriptors such as Scale Invariant Feature Transform (SIFT) descriptors and high-level histograms of word co-occurrences in a spatial neighborhood.

In one embodiment, the classification includes a bag of visual word (BOV) based approach. In this approach, the image is first characterized by a histogram of visual word counts. The visual vocabulary is built automatically from a training set of images. To do this, some image descriptors are extracted from the image. Those descriptors are generally based on texture, color, shape, structure, or their combination and are extracted locally on regions of interest (ROI). The ROI can be obtained by image segmentation, by applying specific interest point detectors, by considering a regular grid, or by or simply random sampling of image patches. For example, Scale Invariant Feature Transform (SIFT) descriptors may be computed on each region.

Given a new image to be classified, it is processed in a similar way and assigned to the most probable class, based on its features. For example, in the case of the BOV approach, each feature vector is assigned to its closest visual word in the previously trained vocabulary or to all visual words in a probabilistic manner in the case of a stochastic model. The histogram is computed by accumulating the occurrences of each visual word. Finally, the histogram is fed to one or a set of classifiers, for example K nearest neighbor, probabilistic latent semantic classifiers. The classifier may analyze the entire image or focus on objects within the image.

Further details of exemplary categorization techniques which may be used herein are to be found in U.S. application Ser. Nos. 11/524,100, and 11/170,496 to Perronnin, and U.S. Pub. Nos. 20070005356, 20070258648, and 20080069456, the disclosures of which are incorporated herein in their entireties by reference, and in the following references: Csurka, G., Dance, C., Fan, L., Willamowski, J., and Bray, C., "Visual Categorization with Bags of Key-points," in *ECCV Workshop on Statistical Learning for Computer Vision* (2004); Perronnin, F., Dance, C., Csurka, G., and Bressan, M., "Adapted Vocabularies for Generic Visual Categorization," in *European Conf. on Computer Vision*. (2006); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004); and Bosch, A., Zisserman, A., and Munoz, X., "Scene Classification via pLSA." in *ECCV* (2007).

Alternatively or additionally, step S104 may include processing of image metadata information such as time, GPS coordinates, etc. For example, GPS coordinates for regions of the world likely to have snow on the date when the photograph was captured are fed into the system 10. Images for these coordinates may be flagged as "potential snow." This information may be used to improve the accuracy of the classifier 34 or used with other techniques for confirming that the image contains snow.

The output of S104 is a set of images labeled with labels that identify then as either "snow content" or "not snow". These labels may be in the form of XML/HTML labels incorporated in the image data, or attached as metadata or provided in a separate file with the set of images.

Degradation Classification (S108)

The enhancement opportunity can be identified by a second classifier 26, such as a GVC or other classifier of the type described above, which is trained to classify previously classified snow content images into images containing blue snow and images containing dark snow. For example, images in a training set of "snow content" images of the type described above, are labeled by human observers as "blue snow" or "dark snow" (additional classes are also contemplated, such as "other"). The classifier is trained on this set of images. In the exemplary embodiment, the classification is a two class problem—the classifier is simply trained to distinguish images with blue snow from dark snow. The classifier then outputs a decision for a new image—blue snow or dark snow.

Alternatively, the enhancement opportunity can be identified by determining whether the image contains blue sky. This may be performed with a simple detector of blue sky based on color. Images identified as having blue sky are then classed as "blue snow."

Using a two step classification method, as described above, in which images first classified as either "snow content" or "not snow" and then determining the enhancement opportunity for the "snow content" images is generally easier than a single classification step in which the image is classified into one of three classes: blue snow, dark snow, and non-snow. However, such a method is not excluded.

Degradation Specific Enhancements (S114, S116)

For each enhancement opportunity identified at S108, a different set of processing operations called an "enhancement chain" is applied. The enhancement chains can be tailored to take into account the results of a user preference evaluation and the analysis of a set of images used in the tests. In the exemplary embodiment, three alternate enhancement chains are employed: for dark snow (S114), blue snow (S116), and if no enhancement opportunities related to snow are detected, the images are processed with a generic image enhancement system (e.g. Xerox AIE) (S100).

1. Dark Snow (S114)

In the case of dark snow images (those images where observers would typically consider the images to be noticeably too dark), the enhancement chain S114 includes the following steps: color space conversion (S118), luminance transformation (S120), and saturation enhancement (S122).

If the image data of an image 14, 18 to be processed by the dark snow enhancement chain is not expressed in a luminance-chrominance color space with a luminance (brightness) component, such as YCbCr, YUV, LUV, or CIE-LAB color space, then at S118, the data is converted to such a color space prior to applying a non-linear luminance transformation at S120. For example, the image data may be input in RGB values and converted to a luminance-chrominance color space. Various methods exist for converting image data from one color space to another. For example, the color space conversion component 40 may include a look up table or other data structure to which the RGB image data is fed, which outputs the corresponding luminance-chrominance values.

Figure 3:
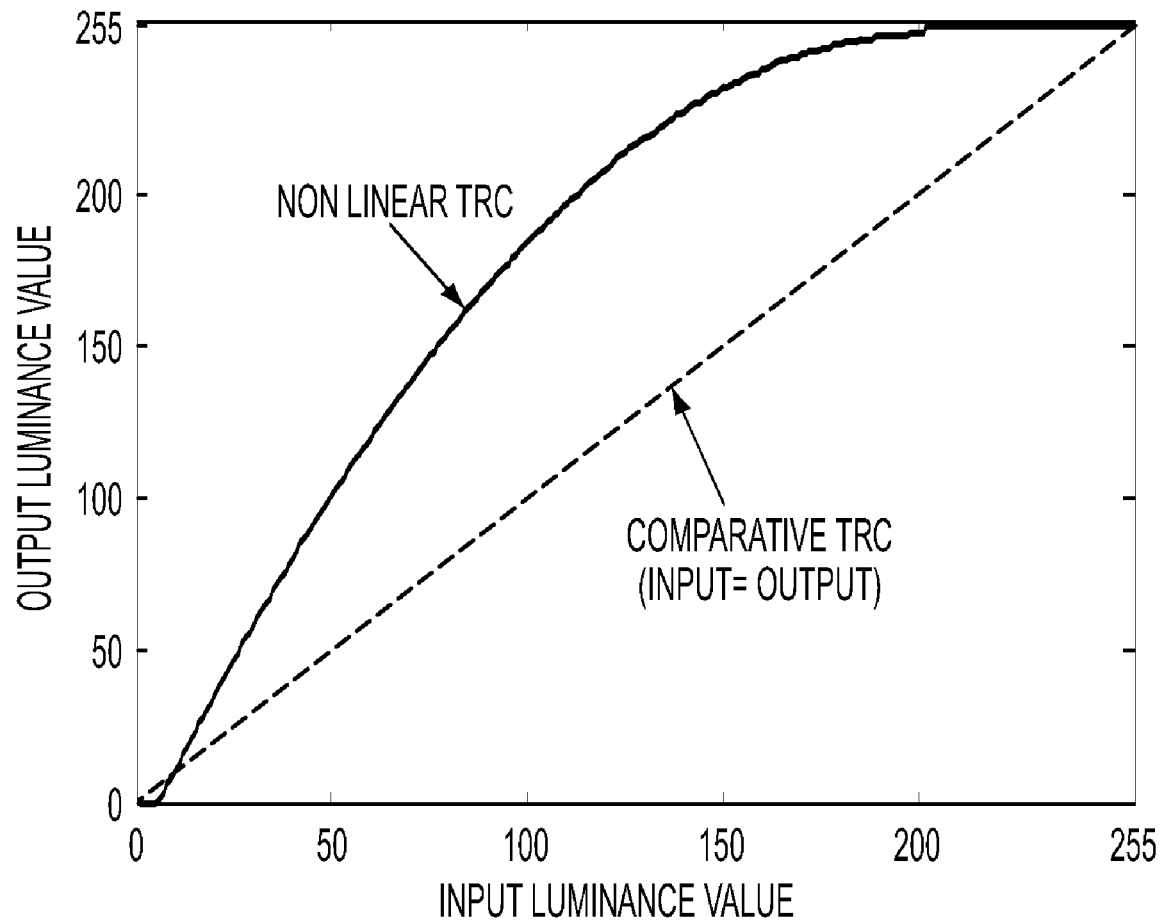
FIG. 3 illustrates an exemplary non-linear tone reproduction curve for adjusting luminance values of a dark snow image.

At S120, the luminance transformation module 42 applies a non-linear transformation to the luminance (Y) channel of the image. The luminance channel values of the pixels in the image may be expressed, for example, on an 8-bit scale having values from 0-255, where 0 represents minimum luminance intensity (black) and 255 represents maximum luminance intensity (white). The Y values are modified according to a non linear transformation, which may be applied in the form of a tone reproduction curve (TRC). An example of such a non-linear transformation is illustrated in FIG. 3. In general, the TRC preferentially expands the mid tones (where the snow is likely to be found), and clips the highlights. Midtone values typically are situated in the middle of the available dynamic range of the picture. For example, midtone values for luminance (Y) may be between 50-150 in an RGB image encoded with 8 bit per channel). Midtone values are thus increased proportionately more than the highlights (e.g., Y values of 0-10 and 200-255). Thus, for example, for a midtone region with an input luminance (Y) value of 100, the TRC increases the luminance value to about 175. Values above about 200 are all assigned a value which is at or very close to the maximum value (255). The exemplary TRC may be based on a parabolic (quadratic) function.

At S122, the saturation enhancement module 44 receives the image as output by S120 and then enhances the saturation of the image. In particular, the saturation enhancement module determines whether the saturation of the image meets predetermined level(s) and if not, performs a modification to the saturation level(s). Thus, the saturation may be increased, decreased or left unchanged. The saturation enhancement helps to avoid flat colors. Saturation refers to the vividness of colored objects in an image. A color with more gray is considered less saturated, while a bright color, one with very little gray in it, is considered highly saturated. In the exemplary enhancement approach, the system detects and modifies the extremes of color saturation to bring the image saturation to a generally acceptable level.

Prior to the saturation enhancement step (S122), the color values of the image may be converted from the luminance-chrominance color space to a suitable color space for saturation enhancement. In one embodiment, the image is transformed into a luminance-hue-saturation color space, such as the HSV (Hue-Saturation-Value) model described in the Xerox Color Encoding Standard XNSS 289005, as described, for example, in U.S. Pat. No. 5,450,217, entitled IMAGE-DEPENDENT COLOR SATURATION CORRECTION IN A NATURAL SCENE PICTORIAL IMAGE, by Reiner Eschbach, the disclosure of which is incorporated herein by reference. In other embodiments, a YCbCr color space is used, thus no further transformation is necessary.

The algorithm employed in the saturation enhancement step may be analogous to that used in XEROX AIE, i.e., by module 32. Exemplary saturation modification techniques are disclosed for example, in above-mentioned U.S. Pat. No. 5,450,217. As disclosed in the U.S. Pat. No. 5,450,217, the method may include determining average saturation for at least a portion of the value range of the original image data as a function of the saturation component (S in the HSV scale), comparing the determined average saturation to a target saturation selected to represent a desirable saturation, and generating a comparison signal indicating whether determined average saturation is less than the target saturation. If the comparison signal indicates that average saturation is less than target saturation, filter coefficients may be generated as a function of average saturation and desired saturation and the image filtered accordingly to produce a saturation-modified image. On the other hand, if the comparison signal indicates average saturation is greater than target saturation, the image may be sent to the next step (S134) without modification to the saturation.

Other exemplary enhancement techniques for modifying saturation which may be utilized herein, singly or in combination, are described, for example, in Haeberli, P. and Voorhies, D., "Image Processing by Linear Interpolation and Extrapolation," *IRIS Universe Magazine, Silicon Graphics*, 28 (1994); and Eschbach, R. and Fuss, W., "Automatic Enhancement of Scanned Photographs," in *EI Color Imaging: Device Independent Color, Color Hardcopy and Graphic Arts* (1999).

The enhancement chain for dark snow is not limited to these enhancements, but may be include additional or different enhancements, which may be identified from and/or validated by user preference studies.

2. Blue Snow

In the case of blue snow images (where observers would typically perceive the snow in the images to be noticeably too blue), the enhancement chain (S116) may include some or all of the following steps: color space conversion (S124), dynamic range correction (S126), color balance (S128), exposure (S130), and sharpness enhancement (S132), which may be carried out in the sequence shown in FIG. 2.

At S124, if the image data is not in an appropriate color space, the image may be converted to a color space suitable for dynamic range correction. For example, the image data is converted to a luminance-chrominance color space, such as YCbCr, as described for step S118 above.

The dynamic range correction module 52 aims at correcting deficiencies in contrast by manipulating the dynamic range of the image data. In particular, the dynamic range of the image may be expanded. A mapping is performed in which the pixel values of the Y channel (luminance values) of at least part of the image data for an input image $I_{in}$ are mapped to new values in the output image $I_{out}$. This mapping ensures that at least a threshold proportion of the image data has low or high luminance values. In particular the values of the input image between $i_{low}$ and $i_{high}$ are mapped to values between $o_{low}$ and $o_{high}$. In one embodiment, $o_{low}$, $o_{high}$ are minimum and maximum values of dynamic range (i.e. 0 and 255). $i_{low}$, $i_{high}$ are chosen so as a predetermined percentage of the pixel data have values outside the range $i_{low}$-$i_{high}$. This percentage may be, for example, in the range of from about 0.2% to about 5% For example, $i_{low}$ and $i_{high}$ are chosen such that 1% of the data is left outside the calculation of the new dynamic range.

Figure 4:
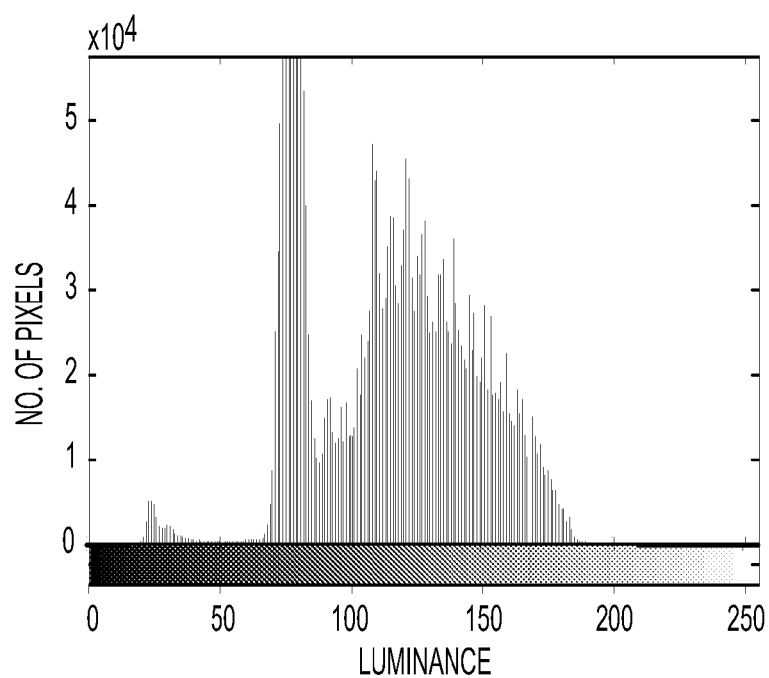
FIG. 4 is a histogram showing luminance distribution in a blue snow image, prior to dynamic range modification.
Figure 5:
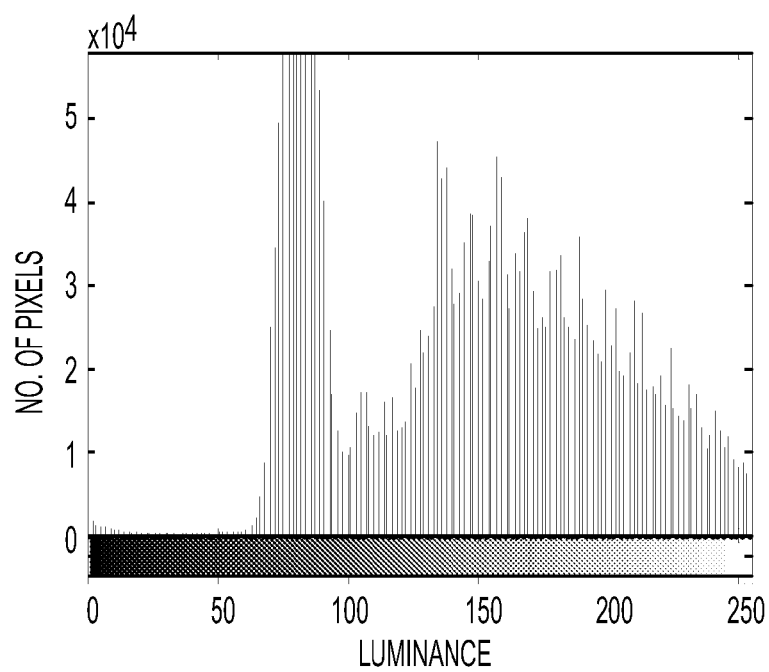
FIG. 5 is a histogram showing luminance distribution in the blue snow image of FIG. 4, after dynamic range modification.

By way of example, FIG. 4 shows a histogram of number of pixels vs. Y channel value for an input (original) image. As can be seen, the image data is concentrated in the mid range, with few image pixels having Y values at the extremes (e.g., below 50 or above 200). FIG. 5 shows a histogram of the image data for the same image after dynamic range mapping. As can be seen, the dynamic range manipulation results in a larger percentage of the pixels having Y values at the two extremes.

After step S126, the image may be converted to a suitable color space for color balance modification. For example, the new YCbCr values for the image pixels are converted back to RGB values.

The second enhancement method (S128) in the chain S116 that is applied to the blue snow image is color balance (sometimes referred to as white balance). This step aims at removing unrealistic color casts from the image. Color balance is the process of adjusting the colors to resemble perceptual response and is generally a global enhancement. In the present application, however, it tends to be more local since the correction is applied to regions with a specific hue. The human visual system ensures the perceived color of objects remains relatively constant under varying illumination and reflectance conditions, e.g., color constancy, but this is not the case for images. In the specific context of snow images, color balance is used to remove the blue cast caused by sky light reflection on snow.

Various strategies can be used to decrease the amount of blue in the image. In one method, S128 may include uniformly modifying the intensity of blue, red and green channels for each pixel in the image in accordance with the function:

$$I_c(x,y)_{OUT} = I_c(x,y)_{IN} + \alpha_c$$

where $I_c(x,y)_{OUT}$ represents the output color value for a pixel at location x,y, $I_c(x,y)_{IN}$ represents the input color value for the same pixel, c represents the colorant (=Red, Green or Blue), and $\alpha_c$ is a constant for the colorant.

A different, fixed $\alpha_c$ may be selected for each channel so as to decrease the amount of blue and increase the reds and greens. For example, $\alpha_R$=+10, $\alpha_G$=+10, $\alpha_B$=−20. With such an approach, however, the snow may still look bluish in some areas and there may be a yellow cast in the image.

Figure 6:
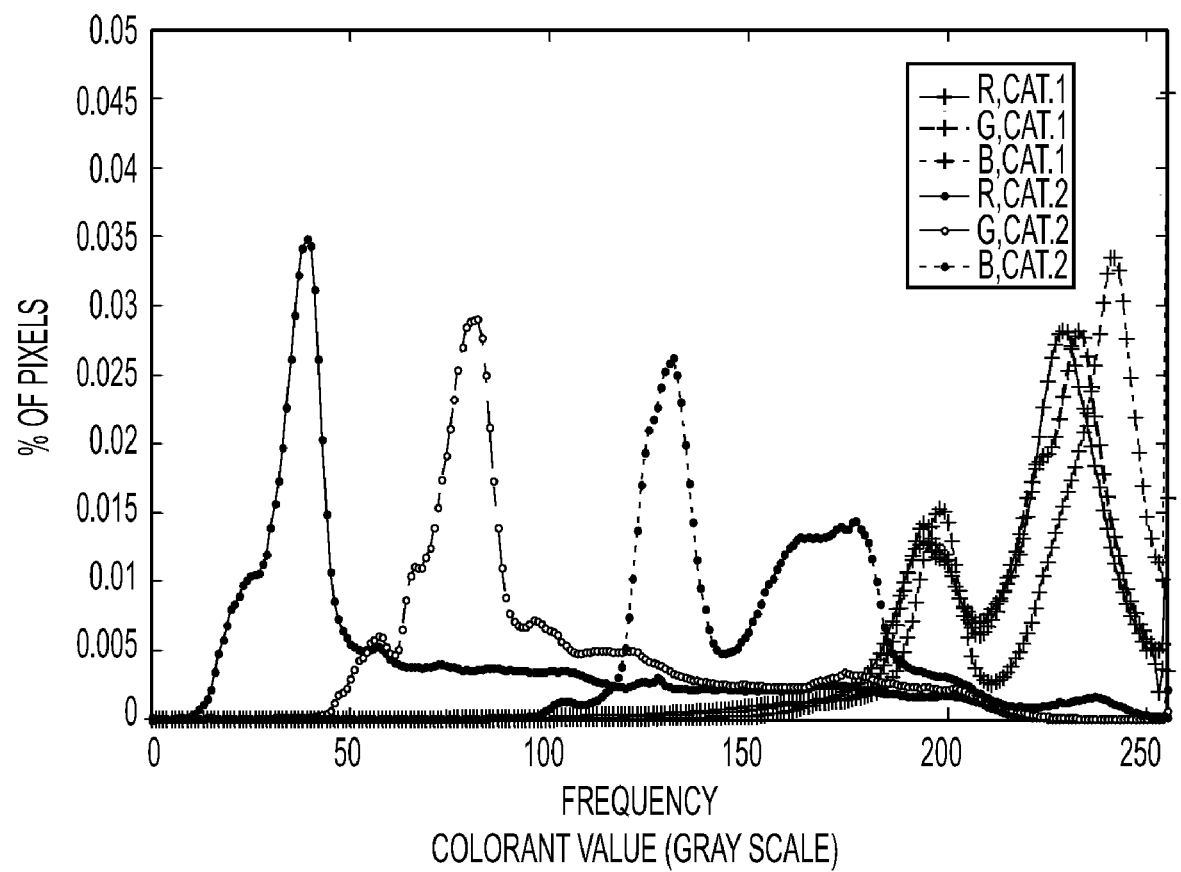
FIG. 6 illustrates histograms of percentages of pixels in the image vs. colorant value (R, G, or B) for good snow (category 1) and bluish snow (category 2) pixels.

In an alternative method, the color channels are modified non-uniformly. This reflects the fact that that the snow pixels affected by the bluish color cast are in a specific range of intensities (grayscale values). This can be demonstrated, as shown in FIG. 6, which shows the percentage of pixels as a function of colorant intensity (here grayscale values on a scale of 0-255 for R, G, and B, respectively) a set of images comprising images categorized as having blue snow content (only the snow part of the images was considered). The images for this test were obtained from a public website and were not enhanced. These images were manually segmented into two classes—good snow (Cat. 1) and blue-casted were snow (Cat. 2). As can be seen from the histograms, the peaks of the Category 1 images are much closer than those for the Category 2 images, as shown in Table 1 below.

TABLE 1

|   | Cat. 1 | Cat. 2 |
|---|--------|--------|
| R | 230    | 40     |
| G | 234    | 83     |
| B | 256    | 132    |

Looking at the results in FIG. 6, it can be seen that the "good snow" is bright (a predominance of high grayscale values) and white (R, G, B histograms peaks are close together). In contrast, the "bad" snow has a strong cast in blues (especially in mid-tones) and low brightness.

Thus, in one embodiment, the blue component is non-uniformly decreased as a function of gray level. In particular, the blue mid grayscale values (90-180 on a scale of 0-255) are reduced, more than the highlights (180-255 and shadows (0-90), and diminishing the saturation around the blues and cyans. Thus, the value of $\alpha_B$ may be more negative in the mid grayscale values than in the other grayscale values. For example, a gradually varying $\alpha_B$ may be applied which has a peak negative value (e.g., −30) in the mid grayscale values (90-180) and is no more negative than about −20 in the highlights and shadows (180-255 and 0-90).

Other exemplary techniques for color balance which may be utilized herein, singly or in combination, are described, for example, Eschbach, R. and Fuss, W., "Automatic Enhancement of Scanned Photographs," in *EI Color Imaging: Device Independent Color, Color Hardcopy and Graphic Arts* (1999) and in U.S. Pat. No. 6,573,932 to Adams, et al., and Barnard, K., Martin, L., Coath, A., and Funt, B., "A Comparison of Computational Color Constancy Algorithms," *IEEE Trans, on Image Processing*, 11(9) (2002).

Exposure correction (S130) as well as a sharpness filter (S132) are optionally applied for fixing the brightness and augmenting the details in snow and vegetation regions.

Exposure refers to the average of the global distribution of intensity along the dynamic range of the image. Making the image darker or lighter can bring details from the shadows or give depth to the colors of the photograph. One approach to correcting exposure is to apply gamma correction to the image intensity. For example, the gamma parameter may be determined automatically from the histogram of the input image, as described in Eschbach, R. and Fuss, W., "Automatic Enhancement of Scanned Photographs," in *EI Color Imaging: Device Independent Color, Color Hardcopy and Graphic Arts* (1999). The exemplary method evaluates the occupancy of the dynamic range of the image and, based on predefined thresholds, determines an appropriate correction it has to perform (e.g., over-expose, under-expose) and also the amount of correction (low, medium, high). Gray snow is typically under-exposed snow, and the system should over-expose it.

Sharpness refers to the presence of crisp edges and fine details in an image. Techniques for sharpening often use filters, which may be applied locally or globally, and are described, for example, in Rosenfeld, A. and Kak, A., *Digital Picture Processing* (Academic Press, Inc., New York. 1982); Gonzalez, R. C. and Woods, R., *Digital Image Processing* (Addison-Wesley Pub. Comp, Inc., Reading, Mass. 1992); Fischer, M., Parades, J., and Arce, G., "Weighted Median Image Sharpeners for the World Wide Web," *IEEE Trans. On Image Processing*, 11(7) (2002); Saito, T., Harada, H., Satsumabayashi, J., and Komatsu, T., "Color Image Sharpening Based on Nonlinear Reaction-Diffusion," in *ICIP* (2003); Polesel, A., Ramponi, G., and Mathews, V. J., "Image Enhancement via Adaptive Unsharp masking," *IEEE Trans. On Image Processing*, 9(3) (2000).

The enhancement chain for blue snow is not limited to these enhancements, but may be include additional or different enhancements, which may be identified from and/or validated by user preference studies. As will be appreciated, the order of the color balance, exposure correction, and sharpness filtering steps may be changed and one or more of these steps may be omitted.

3. Automated Image Enhancement

Optionally, for those images not classed as snow, automated image enhancement is employed as a third enhancement chain (S110). The automated enhancement techniques applied may include methods for correcting exposure, global and local contrast, noise reduction, edge sharpening, color balance, and saturation enhancement. In one embodiment, the Xerox AIE system is used for this enhancement chain. (See for example, www.xerox.com/downloads/usa/en/f/FILE_PROD_AIE_Brochure.pdf and the techniques disclosed in U.S. Pat. Nos. 5,357,352, 5,363,209, 5,371,615, 5,414,538, 5,450,217, 5,450,502, 5,802,214, 5,347,374, and 7,031,534, incorporated by reference.)

The exemplary method can provide improvements over conventional content independent enhancement techniques for many images. Modifications to the enhancement chains can be made, based on user preferences. For example, if in some of the "dark snow" cases, contrast on the snow is lost due to the TRC correction being too strong in the highlights, a simple parameterization of the TRC may be used to solve the problem. For example, a parametric function is used for the TRC (e.g., a polynomial function) with parameters that can be tuned so as to lower the effect of the over-exposure on pixels with high luminance (e.g., highlights).

For images containing blue snow, if user preferences determine that the snow appears white but contrast is too high, a less aggressive parameterization of the dynamic range manipulation step may be employed. For this, a user may manually tune a parameter which controls the extent to which the dynamic range is expanded.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A content-based image processing method comprising:
   automatically identifying whether an original image includes snow content; and
   for an image which is identified as including snow content:
      automatically assigning a degradation class for the image, selected from a plurality of degradation classes, the classes comprising a first class for dark snow images and a second class for blue snow images,
      processing the image to generate an enhanced image, comprising, where the image is assigned to the first class, applying a first enhancement chain, and where the image is assigned to the second class, applying a second enhancement chain, and
      outputting the enhanced image.

2. The method of claim 1, wherein the identifying whether the image comprises snow includes classifying the image with a first automated classifier trained to distinguish between images with snow content and images without snow content.

3. The method of claim 1, wherein the assigning a degradation class for the image includes classifying the image with a second automated classifier trained to distinguish between images with dark snow and images with blue snow.

4. The method of claim 1, wherein the first enhancement chain comprises applying a non-linear transformation to a luminance component of image data for the image.

5. The method of claim 4, wherein the applying the non-linear transformation comprises applying a tone reproduction curve to the image data which preferentially increases mid tone luminance values.

6. The method of claim 4, wherein the applying the non-linear transformation comprises applying a parabolic function to the luminance component of the image data.

7. The method of claim 4, further comprising, prior to the application of the non-linear transformation, converting image data for the image to a luminance-chrominance color space.

8. The method of claim 4, further comprising applying a saturation enhancement to the image.

9. The method of claim 1, wherein the second enhancement chain comprises applying a dynamic range manipulation to the image data.

10. The method of claim 9, wherein the dynamic range manipulation ensures that at least a threshold proportion of the image data has low or high luminance values.

11. The method of claim 9, wherein the dynamic range manipulation maps luminance values of the input image that are between a first value $i_{low}$ and a second value $i_{high}$ to values between a third value $o_{low}$ and a fourth value $o_{high}$, where $(o_{high}-o_{low})<(i_{high}-i_{low})$.

12. The method of claim 9, wherein the second enhancement chain further comprises applying a color balance correction to the image which decreases an amount of the blue component of the image.

13. The method of claim 12, wherein the blue component is non-uniformly decreased as a function of gray level.

14. The method of claim 12, wherein the blue component is preferentially decreased in the mid tones.

15. The method of claim 1, wherein when the image is not identified as including a snow content, the method includes applying a content-independent enhancement chain to the image.

16. A computer program product including a non-transitory computer-readable medium which encodes instructions which, when executed by a computer, perform a method comprising:
- automatically identifying whether an original image includes snow content; and for an image which is identified as including snow content:
- automatically assigning a degradation class for the image, selected from a plurality of degradation classes, the classes comprising a first class for dark snow images and a second class for blue snow images,
- processing the image to generate an enhanced image, comprising, where the image is assigned to the first class, applying a first enhancement chain, and where the image is assigned to the second class, applying a second enhancement chain, and
- outputting the enhanced image.

17. A content-based image processing system comprising:
- a snow identifier which is configured for automatically identifying whether an original image includes snow content;
- a snow degradation classifier which, for an image which is identified by the snow identifier as including snow content, automatically assigns a degradation class for the image, selected from a plurality of degradation classes, the classes comprising a first class for dark snow images and a second class for blue snow images;
- the system applying a first enhancement chain for images assigned to the first degradation class and a second enhancement chain for images assigned to the second degradation class.

18. The system of claim 17, wherein the snow identifier includes a first automated classifier trained to distinguish between images with snow content and images without snow content.

19. The system of claim 17, comprising a luminance transformation component for applying a non-linear transformation to a luminance component of image data for the image in the first enhancement chain.

20. The system of claim 17, comprising a dynamic range component for dynamic range manipulation to the image data in the second enhancement chain.

21. The system of claim 17, further comprising a content-independent enhancement processor for processing images that are not identified as having a snow content.

22. A method for processing a set of images comprising:
- inputting a set of original images;
- automatically identifying images having dark snow content;
- automatically identifying images having blue snow content;
- for the images identified as having dark snow, automatically applying an enhancement chain which includes a non-linear luminance transformation and a saturation enhancement operation;
- for the images identified as having blue snow, automatically applying an enhancement chain which includes a dynamic range mapping and a color balance correction to the image which decreases an amount of the blue component of the image non-uniformly as a function of gray level; and
- outputting the enhanced images.

* * * * *